United States Patent
Wong et al.

(10) Patent No.: US 10,798,537 B2
(45) Date of Patent: Oct. 6, 2020

(54) NEXT GENERATION FIXED WIRELESS QUALIFICATION TOOL FOR SPEED-TIER BASED SUBSCRIPTION

(71) Applicant: AT&T Intellectual Property I, L.P., Atlanta, GA (US)

(72) Inventors: Tony Wah-Tung Wong, Dallas, TX (US); Zhen Wan, Plano, TX (US); Jyothis John, Rowlett, TX (US); Ravi Raina, Skillman, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/030,531

(22) Filed: Jul. 9, 2018

(65) Prior Publication Data
US 2020/0015046 A1    Jan. 9, 2020

(51) Int. Cl.
*H04W 4/24* (2018.01)
*H04W 24/10* (2009.01)
(Continued)

(52) U.S. Cl.
CPC ............. *H04W 4/24* (2013.01); *H04M 15/75* (2013.01); *H04W 16/18* (2013.01); *H04W 24/10* (2013.01)

(58) Field of Classification Search
CPC ...... H04M 15/00; H04M 15/42; H04M 15/80; H04M 4/24; H04W 4/24; H04W 72/1231; H04L 12/14
See application file for complete search history.

(56) References Cited

U.S. PATENT DOCUMENTS 6,560,459 B1   5/2003  Wong
6,873,597 B1   3/2005  King
(Continued)

FOREIGN PATENT DOCUMENTS

CN     101309204 B    2/2015
WO   2012/075347 A1   6/2012
(Continued)

OTHER PUBLICATIONS

Zhang et al., "Heterogeneous Statistical QoS Provisioning over 5G Mobile Wireless Networks", IEEE Network URL: http://www.ece.tamu.edu/~xizhang/papers/IEEE_Network_Journal_5G_Xi_Zhang.pdf, vol. 28, No. 6, Nov.-Dec. 2014, pp. 46-53.
(Continued)

*Primary Examiner* — Rafael Pérez-Gutiérrez
*Assistant Examiner* — Xiang Zhang
(74) *Attorney, Agent, or Firm* — Amin, Turocy & Watson, LLP

(57) ABSTRACT

A speed tier based pricing scheme is utilized to increase average revenue per user (ARPU) for fixed wireless applications. To offer a speed tier based pricing scheme, a radio environment at a location of Customer Premise Equipment (CPE) and/or data associated with cell sites serving the location can be analyzed to estimate a maximum data rate that can be delivered to the user CPE with a high confidence. Based on the estimated data rate, one or more speed tiers that can be offered to the customer for subscription. Further, based on an analysis of observed network usage and/or traffic demand per customer location with reference to the speed-tier classes subscribed to by existing customers, the network can efficiently plan for on-boarding new customers and/or network expansion.

20 Claims, 13 Drawing Sheets

(51) Int. Cl.
*H04M 15/00* (2006.01)
*H04W 16/18* (2009.01)

(56) References Cited

U.S. PATENT DOCUMENTS

| | | | |
|---|---|---|---|
| 7,313,402 B1* | 12/2007 | Rahman | H04W 24/06 |
| | | | 455/456.1 |
| 7,463,600 B2 | 12/2008 | Tong et al. | |
| 7,743,002 B2 | 6/2010 | Hernandez | |
| 7,801,783 B2 | 9/2010 | Kende et al. | |
| 7,894,324 B2 | 2/2011 | Laroia et al. | |
| 8,005,726 B1 | 8/2011 | Bao | |
| 8,019,683 B1 | 9/2011 | Swanburg et al. | |
| 8,064,392 B2 | 11/2011 | Chang et al. | |
| 8,971,841 B2 | 3/2015 | Menezes et al. | |
| 8,976,887 B2 | 3/2015 | Reingold | |
| 9,124,436 B2 | 9/2015 | Kashanian | |
| 9,137,698 B2 | 9/2015 | Li et al. | |
| 9,154,225 B2 | 10/2015 | Smith | |
| 9,191,974 B2 | 11/2015 | Chaudhuri et al. | |
| 9,253,663 B2 | 2/2016 | Raleigh et al. | |
| 9,264,372 B2 | 2/2016 | Stanwood et al. | |
| 9,264,878 B2 | 2/2016 | Young et al. | |
| 9,432,522 B2 | 8/2016 | Hutcheson et al. | |
| 9,439,093 B2 | 9/2016 | Chetlur et al. | |
| 9,456,354 B2 | 9/2016 | Branlund | |
| 9,467,909 B2 | 10/2016 | Faerber et al. | |
| 9,565,697 B2 | 2/2017 | Ameigeiras Gutierrez et al. | |
| 9,603,047 B2 | 3/2017 | Sridhar et al. | |
| 9,621,248 B2 | 4/2017 | Maltsev et al. | |
| 9,647,918 B2 | 5/2017 | Raleigh et al. | |
| 9,667,805 B2 | 5/2017 | Tapia | |
| 9,775,050 B1 | 9/2017 | Wang et al. | |
| 9,781,738 B2 | 10/2017 | Pietraski et al. | |
| 9,794,825 B2 | 10/2017 | Grinshpun et al. | |
| 9,813,973 B2 | 11/2017 | Ben et al. | |
| 9,860,757 B2 | 1/2018 | Udeshi et al. | |
| 9,883,049 B1 | 1/2018 | Warner | |
| 9,924,045 B1 | 3/2018 | Guha et al. | |
| 10,075,985 B2 | 9/2018 | Pawar et al. | |
| 10,158,555 B2 | 12/2018 | Ghosh et al. | |
| 10,419,943 B1 | 9/2019 | Wong et al. | |
| 2002/0142773 A1* | 10/2002 | Rudrapatna | H04W 28/22 |
| | | | 455/440 |
| 2003/0012138 A1 | 1/2003 | Abdelilah et al. | |
| 2004/0259567 A1 | 12/2004 | Valko et al. | |
| 2004/0264371 A1 | 12/2004 | Chen | |
| 2005/0094605 A1 | 5/2005 | Sun et al. | |
| 2005/0254501 A1 | 11/2005 | Laiho | |
| 2006/0098670 A1* | 5/2006 | Voit | H04L 41/0253 |
| | | | 370/401 |
| 2007/0178833 A1 | 8/2007 | Wahlberg et al. | |
| 2007/0229214 A1 | 10/2007 | Meirick et al. | |
| 2007/0275665 A1* | 11/2007 | Molnar | H04L 1/0002 |
| | | | 455/67.13 |
| 2008/0062890 A1 | 3/2008 | Temple | |
| 2008/0147846 A1* | 6/2008 | Behroozi | H04L 43/50 |
| | | | 709/224 |
| 2008/0233992 A1* | 9/2008 | Oteri | H04W 52/241 |
| | | | 455/522 |
| 2008/0299986 A1 | 12/2008 | Lee | |
| 2009/0240547 A1 | 9/2009 | Fellenstein et al. | |
| 2010/0248643 A1* | 9/2010 | Aaron | H04L 1/0002 |
| | | | 455/68 |
| 2010/0273418 A1 | 10/2010 | Eruchimovitch et al. | |
| 2011/0249678 A1* | 10/2011 | Bonicatto | H04L 1/0003 |
| | | | 370/400 |
| 2012/0027409 A1* | 2/2012 | Agrawal | H04B 10/1129 |
| | | | 398/58 |
| 2012/0113937 A1 | 5/2012 | Aramoto et al. | |
| 2012/0176898 A1 | 7/2012 | Ehsan et al. | |
| 2013/0007757 A1 | 1/2013 | Chambliss et al. | |
| 2013/0067082 A1 | 3/2013 | Khan | |
| 2013/0138956 A1* | 5/2013 | Swist | H04N 21/41415 |
| | | | 713/168 |
| 2013/0138976 A1 | 5/2013 | Kim | |
| 2013/0143553 A1* | 6/2013 | Beattie, Jr. | H04W 24/08 |
| | | | 455/434 |
| 2013/0218814 A1* | 8/2013 | Kang | G06Q 10/00 |
| | | | 706/12 |
| 2013/0229953 A1 | 9/2013 | Nam et al. | |
| 2013/0321225 A1 | 12/2013 | Pettus | |
| 2014/0056149 A1 | 2/2014 | Mani et al. | |
| 2014/0073337 A1 | 3/2014 | Hong et al. | |
| 2014/0087739 A1* | 3/2014 | Weaver | H04W 16/18 |
| | | | 455/441 |
| 2014/0241174 A1 | 8/2014 | Harris et al. | |
| 2014/0321282 A1 | 10/2014 | Pragada et al. | |
| 2015/0043337 A1 | 2/2015 | Kanamarlapudi et al. | |
| 2015/0071248 A1 | 3/2015 | Faerber et al. | |
| 2015/0133131 A1* | 5/2015 | Van Phan | H04W 88/04 |
| | | | 455/450 |
| 2015/0222345 A1* | 8/2015 | Chapman | H04B 7/0617 |
| | | | 370/332 |
| 2015/0230255 A1 | 8/2015 | Lopes | |
| 2015/0296499 A1 | 10/2015 | Huang et al. | |
| 2015/0325912 A1 | 11/2015 | Liu | |
| 2015/0341872 A1 | 11/2015 | Ryu et al. | |
| 2016/0020844 A1 | 1/2016 | Hart et al. | |
| 2016/0066261 A1 | 3/2016 | Nasielski et al. | |
| 2016/0086260 A1* | 3/2016 | Vermeulen | G06Q 40/00 |
| | | | 705/35 |
| 2016/0226703 A1 | 8/2016 | Grinshpun et al. | |
| 2016/0269097 A1 | 9/2016 | Islam et al. | |
| 2017/0181134 A1 | 6/2017 | Niu et al. | |
| 2017/0230893 A1 | 8/2017 | Miao et al. | |
| 2017/0245192 A1 | 8/2017 | Sadri et al. | |
| 2017/0289837 A1 | 10/2017 | Duo et al. | |
| 2017/0303160 A1 | 10/2017 | Poltorak et al. | |
| 2017/0332282 A1 | 11/2017 | Dao | |
| 2018/0020462 A1 | 1/2018 | Xiong et al. | |
| 2018/0027561 A1 | 1/2018 | Segec et al. | |
| 2018/0035301 A1 | 2/2018 | Nama et al. | |
| 2018/0042018 A1 | 2/2018 | Bhushan et al. | |
| 2018/0091278 A1 | 3/2018 | Kanamarlapudi et al. | |
| 2018/0092139 A1 | 3/2018 | Novlan et al. | |
| 2018/0167919 A1 | 6/2018 | Kim et al. | |
| 2018/0167941 A1 | 6/2018 | Zhang et al. | |
| 2018/0192428 A1 | 7/2018 | Doostnejad et al. | |
| 2018/0194248 A1 | 7/2018 | Doostnejad et al. | |
| 2018/0198883 A1 | 7/2018 | Vuomos et al. | |
| 2018/0220305 A1 | 8/2018 | Lei | |
| 2018/0242184 A1 | 8/2018 | Yerramalli et al. | |
| 2018/0242291 A1 | 8/2018 | Moon et al. | |
| 2018/0316481 A1 | 11/2018 | Montojo et al. | |
| 2018/0351809 A1 | 12/2018 | Meredith et al. | |
| 2018/0359746 A1 | 12/2018 | Kim et al. | |
| 2018/0359801 A1 | 12/2018 | Kim et al. | |
| 2018/0368114 A1 | 12/2018 | Chen et al. | |
| 2018/0368126 A1 | 12/2018 | Islam et al. | |
| 2019/0149365 A1 | 5/2019 | Chatterjee et al. | |
| 2019/0150190 A1 | 5/2019 | Kim et al. | |
| 2019/0158332 A1 | 5/2019 | Akkarakaran et al. | |
| 2019/0274148 A1 | 9/2019 | Xiong et al. | |

FOREIGN PATENT DOCUMENTS

| | | |
|---|---|---|
| WO | 2013058673 | 4/2013 |
| WO | 2013158237 | 10/2013 |
| WO | 2013/188629 A2 | 12/2013 |
| WO | 2015197537 | 12/2015 |
| WO | 2017/074362 A1 | 5/2017 |

OTHER PUBLICATIONS

Ferdosian et al., "Greedy-Knapsack Algorithm for Optimal Downlink Resource Allocation in LTE Networks", Wireless Networks URL: https://arxiv.org/pdf/1601.03461.pdf, vol. 22, No. 5, 2016, 15 pages.

Anthony et al., "Data plan throttling: A Simple Consumer Choice Mechanism", 2013 IEEE Global Communications Conference (GLOBECOM), DOI: 10.1109/GLOCOM.2013.6831556, Atlanta,

(56) References Cited

OTHER PUBLICATIONS

USA, URL: https://suscholar.southwestern.edu/bitstream/handle/11214/125/DataPlanThrottling.pdf?sequence=1&isAllowed=y, Dec. 9-13, 2013, 6 pages.

CISCO, "Use Case: Speed Tiers Data Plan", At-A-Glance, URL:https://www.cisco.com/c/dam/en/us/solutions/collateral/service-provider/mobile-internet-applications-services/at-a-glance-c45-731340.pdf, Jul. 2014, 2 pages.

Dehos, et al. "Millimeter-wave access and backhauling: the solution to the exponential data traffic increase in 5G mobile communications systems?" IEEE Communications Magazine • Sep. 2014, 8 pages.

Taori, et al. "Point-to-multipoint in-band mmwave backhaul for 5G networks" IEEE Communications Magazine • Jan. 2015, 7 pages.

Mueck, et al. "Spectrum sharing: Licensed shared access (ISA) and spectrum access system (sas)" Intel White Paper, Oct. 2015, 27 pages.

Gao, et al. "MmWave massive-MIMO-based wireless backhaul for the 5G ultra-dense network" arXIV:1508.03940v3, Nov. 27, 2015. 7 pages.

Hur, et al. "Millimeter wave beamforming for wireless backhaul and access in small cell networks" IEEE Transactions on Communications, vol. 61, No. 10, Oct. 2013, 13 pages.

Office Action dated Jan. 9, 2019 for U.S. Appl. No. 15/990,475, 24 pages.

Office Action dated Jan. 22, 2019 for U.S. Appl. No. 16/010,332, 41 pages.

Tony. "The Optimal Antenna Beam Width for the LTE Deployment: Base Station Antenna from the 1G to 4G—History, Field Study, Simulation, Paradigm Change, and now perhaps Paradigm Change again?" LTE University—Expert Opinion. URL [http://lteuniversity.com/get_trained/expert_opinion1/b/twong/archive/2013/09/18/the-optimal-antenna-beam-width-for-the-lte-deployment-base-station-antenna-from-the-1g-to-4g-history-field-study-simulation-paradigm-change-and-now-perhaps-paradigm-change-again.aspx], dated Sep. 18, 2013, retrieved Mar. 19, 2019, 3 pages.

Notice of Allowance received for U.S. Appl. No. 15/990,475 dated May 15, 2019, 33 pages.

Notice of Allowance received for U.S. Appl. No. 16/010,332 dated May 7, 2019, 45 pages.

Non-Final Office Action received for U.S. Appl. No. 16/532,561 dated Oct. 31, 2019, 36 pages.

Non-Final Office Action received for U.S. Appl. No. 16/540,868 dated Oct. 29, 2019, 26 pages.

\* cited by examiner

NEXT GENERATION FIXED WIRELESS QUALIFICATION TOOL FOR SPEED-TIER BASED SUBSCRIPTION

TECHNICAL FIELD

The subject disclosure relates to wireless services, e.g., a next generation fixed wireless qualification tool (NGFW-QT) for speed-tier based subscription.

BACKGROUND

Fixed wireless networks provide an efficient method of delivering Internet connectivity to consumers over a radio interface. Typically, fixed wireless networks are being utilized to provide internet service to rural Connect America Fund Phase II (CAF II) customers that are underserved. Also, fixed wireless services can be offered to provide internet access to most any fixed customers that are currently underserved. Unlike Digital Subscriber Line (DSL) and/or cable Internet that utilize wired connections, fixed wireless technology couples the mainstream Internet "backbone" to customer premises via a radio interface between an access point (e.g., base transceiver station (BTS)) and one or more Customer Premise Equipment (CPE).

With growth in communication services, network service providers continue to increase the services (e.g., voice and/or data) that are to be delivered to subscribers. Typically, subscribers can avail the services by purchasing subscriptions and/or service plans from the network service providers. Conventionally, wireless communication services, including fixed wireless services, are offered to the subscriber based on a monthly usage rate. Typically, a user pays a basic flat rate monthly fee for a basic level of the service. Users that expect to use more than the basic level of data, or require a higher quality-of-service, can subscribe to higher level plans. For example, a user can pay \$X per month for a 150 GB package, \$Y per month for a 250 GB package, \$Z per month for a 400 GB package and so on and so forth (e.g., wherein X<Y<Z). This billing approach can be fairly limiting for a subscriber and can provide a low average revenue per user (ARPU) metric for a network provider.

The above-described background is merely intended to provide a contextual overview of some current issues, and is not intended to be exhaustive. Other contextual information may become further apparent upon review of the following detailed description.

DETAILED DESCRIPTION

Figure 1:
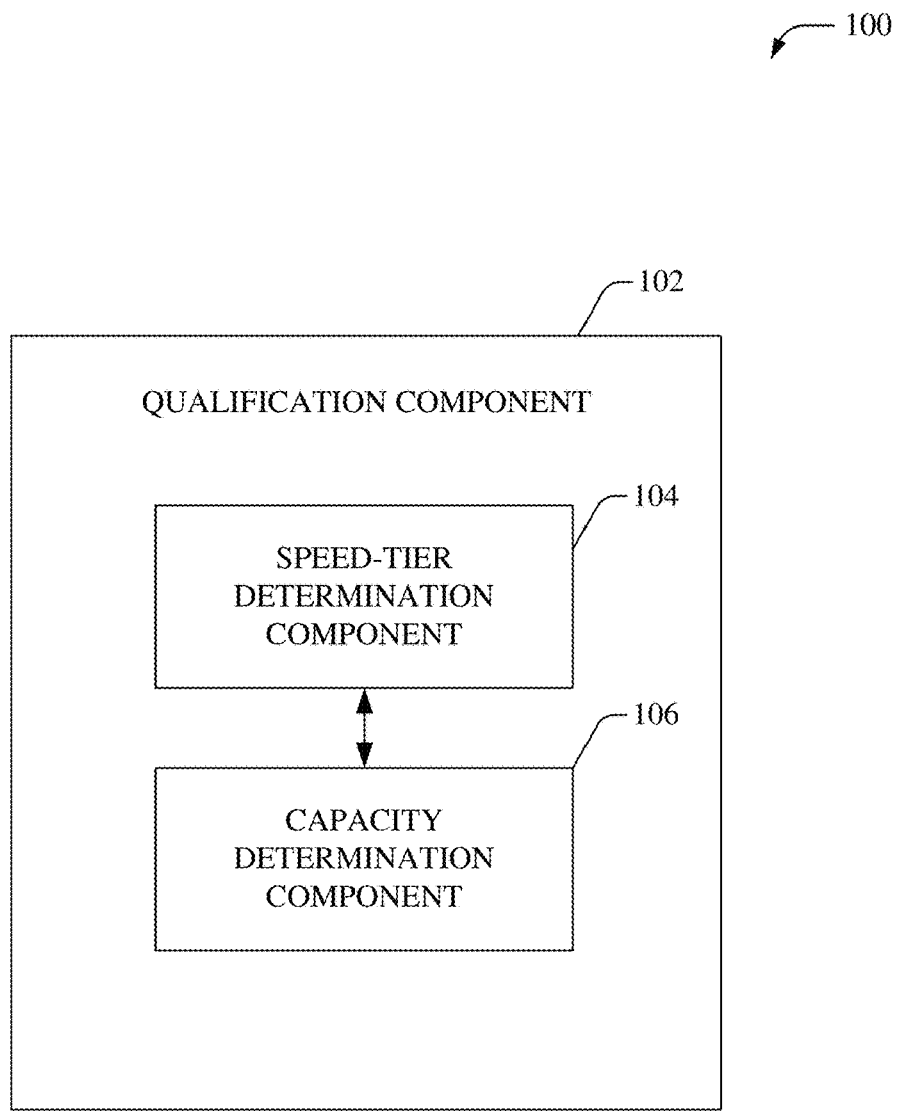
FIG. 1 illustrates an example system that facilitates determining service eligibility for subscribers.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "point," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," "customer premises equipment," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth. Further, it is noted that the term "upstream" as used herein refers to a direction in which data sent for a "stream" flowing from a user equipment to a network service provider device (or content provider device or application provider device). As an example, if a first device is closer to (fewer hops away from) the network service provider device than a second device, then the first device is said to be upstream from the second device or conversely, the second device is downstream from the first device.

It should be noted that although various aspects and embodiments have been described herein in the context of fixed wireless and/or nomadic networks, the disclosed aspects are not limited to LTE (Long Term Evolution) technology and can be applied to other wireless communication technologies and their evolutions, comprising but not limited to 4G and/or future wireless technologies (e.g., to provide Internet of Things (IoT) connectivity). As an example, the wireless communication technologies can also include universal mobile telecommunications system (UMTS), code division multiple access (CDMA), Wi-Fi, worldwide interoperability for microwave access (WiMAX), general packet radio service (GPRS), enhanced GPRS, third generation partnership project (3GPP), LTE, third generation partnership project 2 (3GPP2) ultra mobile broadband (UMB), high speed packet access (HSPA), evolved high speed packet access (HSPA+), high-speed downlink packet access (HSDPA), high-speed uplink packet access (HSUPA), Zigbee, or another IEEE 802.XX technology. Additionally, substantially all aspects disclosed herein can be exploited in other next generation networks and/or legacy telecommunication technologies.

Fixed Wireless Internet (FWI) service, utilizing LTE on Band 30, has been utilized to provide basic internet service to rural Connect America Fund phase II (CAF II) customers who are underserved and/or unserved. The FWI service utilizes a professionally installed outdoor wireless antenna (OWA) and residential gateway (RG) together as a Customer Premise Equipment (CPE). Access points are deployed to wirelessly communicate with the CPE while maintaining a minimum CAF II performance requirement (e.g., minimum downlink (DL) of 10 Mbps, minimum uplink (UL) of 1 Mbps, and/or round-trip latency of less than or equal to 100 ms). Conventionally, the FWI is offered to subscribers based on a fixed data usage fee. For example, a flat fee is charged for a specified amount of data usage, for example, per month. However, the speed of the data delivery is not utilized as a determining factor for billing.

The systems and methods disclosed in one or more embodiments herein, enable service providers to offer wireless services to subscribers at different speed tiers. For example, subscribers can pay an additional fee to be upgraded to a faster speed tier (e.g., that target to communicate at a higher data rate). In one aspect, an analysis of a radio environment at a location of a User Equipment (UE)/CPE allows to setup tiers of target data rates for the UE/CPE within a sector (e.g., across multiple carriers if/when carrier aggregation is in place, or in a dual connectivity (DC) deployment scenario, wherein the subscriber can be connected to the communication network across frequency bands and/or different communication technologies). Further, the disclosed systems and methods provide a tool to efficiently plan for on-boarding users and/or network expansion. Accordingly, the average revenue per user (ARPU) can be significantly increased from that of the conventional systems.

Referring initially to FIG. 1, there illustrated is an example system 100 that facilitates determining service eligibility for subscribers, according to one or more aspects of the disclosed subject matter. In one aspect, a qualification component 102 can be utilized to determine a highest sustainable speed tier and manage cell capacity during customer on-boarding/registration. Next generation fixed wireless (NGFW) operators can deploy broadband services to subscribers based on a speed-tier pricing scheme. Typically, the speed-tier pricing scheme provides customers with billing options based on different combinations of data throughput and data usage, which can significantly increase the ARPU. As an example, the qualification component 102 can be part of a network device, for example, within a core network. In one embodiment, the network device can be deployed within and/or coupled to a fixed and/or nomadic wireless network.

Both the operators and prospective customers alike would like to know beforehand, a service level agreement (SLA) that both parties can achieve, for example, at a given customer location. As an example, the operators would like to know an estimated sustainable data throughput that can be provided for the prospective customer and the prospective customer would like to know if the estimated sustainable data throughput rate will meet his/her expectation. In one aspect, a speed tier determination component 104 can be utilized to determine the estimated sustainable data throughput for a particular customer location. As an example, the speed-tier determination component 104 can predict the estimated sustainable data throughput range based on an analysis of various factors, such as but not limited to, radio environment at the location, radio frequency (RF) channel conditions, antenna configurations of cells serving the location (e.g., cell sites associated with multiple carriers if/when carrier aggregation is in place, and/or in a DC deployment scenario, wherein service can be provided across different frequency bands and/or different communication technologies), geographical data (e.g., terrain, line of sight, etc.) associated with the location, multi-user, multiple-input, multiple-output (MU-MIMO) effects due to the geographical relationship with the other subscribers, historical data, weather, etc. Based on the range, the speed-tier determination component 104 can determine a data throughput value that can be consistently maintained at the location with a high confidence (e.g., greater than a defined confidence threshold). A customer can then be qualified for the determined data throughput with the determined confidence value (e.g., 80-90% confidence). In one aspect, a set of speed tiers, wherein the highest speed tier offers the determined data throughput, can be provided to the customer prior to and/or during an on-boarding process (e.g., before and/or as part of initiating a service/contract/agreement and/or other registration process). This can allow the customer to customize their service and/or provide increased flexibility for both customer and operator.

Further, in another aspect, a capacity determination component 106 can be utilized to verify that sufficient cell capacity is available to support the new/potential customer. According to an embodiment, the capacity determination component 106 can calculate traffic demand per customer location with reference to the speed-tier classes that the existing customers have already signed up for and can determine network capacity availability, for example, by using Big Data (BD) analytics (e.g., based on the historical usage patterns of existing users). Oftentimes, users can subscribe to a higher data usage than they actually utilize, users do not run/use the applications and/or services that run at the subscribed speed-tier, users do not run the applications and/or services during the peak/rush hours, etc. Accordingly, the capacity determination component 106 can monitor network usage and can manage capacity availability to on-board new customers at a particular location.

Figure 2:
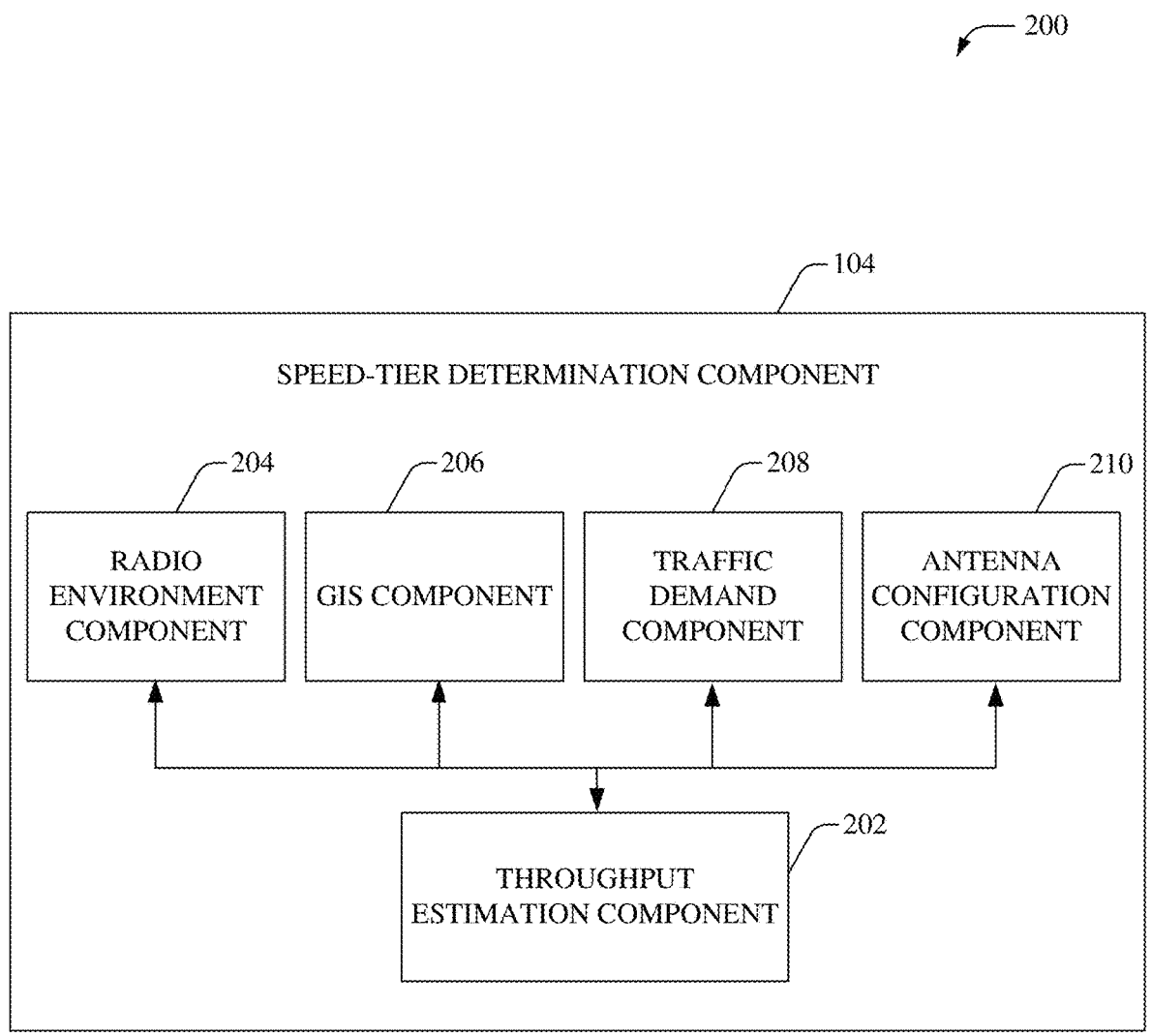
FIG. 2 illustrates an example system that facilitates location-based speed-tier qualification.

Referring now to FIG. 2, there illustrated is an example system 200 that facilitates location-based speed-tier qualification, in accordance with an aspect of the subject disclosure. It is noted that the speed-tier determination component 104 can comprise functionality as more fully described herein, for example, as described above with regards to system 100.

According to an embodiment, a throughput estimation component 202 can determine a sustainable data throughput that can be provided at a location/area. For example, the throughput estimation component 202 can predict, for example, based on machine learning, big data, and/or other analysis, a minimum data throughput value that can be delivered at a location. The prediction can be based on various factors, such as, but not limited to data received from a radio environment component 204, a geographical information system (GIS) component 206, traffic demand component 208, antenna configuration component 210, etc.

Typically, the qualification component 102 can generate a geographical grid map that represents different geographical locations as grids. In one aspect, the resolution of the map can be dynamically changed and/or adjusted. For example, a 100×100 m (or larger) grid can be utilized for rural and/or sparsely populated areas while, a 10×10 m grid (or smaller) for grid can be utilized for urban and/or densely populated areas. An optimal resolution can be determined based on a cost-benefit analysis that is a function of a trade-off between computing time and/or resources, and required accuracy.

In one example, the radio environment component 204 can determine radio signal propagation characteristics within each grid. Typically, the radio signal propagation characteristics can vary based on several factors, such as, but not limited to, geographical terrain, weather (e.g., rain), environmental factors, vegetation and/or foliage effects, multipath induced fading, shadowing from obstacles affecting the wave propagation, line of sight, etc. For example, a radio signal quality can be attenuated/degraded in summer months when foliage is maximum as compared to the foliage in winter months. The data determined by the radio environment component 204 can be utilized (e.g., by the throughput estimation component 202) to determine a range of throughput values that can be delivered to a location.

Based on the RF frequency (e.g., sub-6 GHz used in NGFW) and the parameters customized for a specific radio access technology (e.g., LTE+), the speed-tier determination component 104 can determine potential serving cells that can serve different clusters of subscribers within each grid. In one example, the GIS component 206 can determine information regarding the locations and/or technical details (e.g., configurations, classification, etc.) of existing access points (e.g., BTSs) that serve the grid (and/or at least a portion of the grid). In another example, the traffic demand component 208 can determine traffic demand within the grid with reference to the speed-tier classes that have been subscribed by the existing customers within the grid. As an example, the traffic demand component 208 can track (and/or predict) traffic patterns and/or existing cell loading, for example, during specific time intervals (e.g., peak hours) and/or sustaining. In yet another example, the antenna configuration component 210 can predict and/or estimate a signal qualities of a possible cell(s) serving the grid (or a portion of the grid) based on antenna configurations of a CPE. For example, a signal quality of signals received via an outdoor wireless antenna (OWA) can be better than a signal quality of signals received via an indoor wireless antenna (IWA).

The throughput estimation component 202 can analyze information comprising, but not limited to, data determined by the radio environment component 204, GIS component 206, traffic demand component 208, and/or antenna configuration component 210 to determine (e.g., predict) an estimated data rate that can be consistently provided to a user equipment (UE) at a given location. As an example, the data rate provided at a location can vary, due to several factors (e.g., weather, RF propagation loss, etc.). The estimated data rate can comprise a highest sustainable data rate value that can be consistently maintained, for example, with minimal variation and/or without falling below the estimated data rate. Based on the estimated data rate, the user can be offered one or more speed tiers (e.g., that correspond to data rates equal to or less than the estimated data rate) that are available at the location. Typically, a different fee can be charged for the different speed tiers. Accordingly, the user can select and/or subscribe to a specific speed tier and data usage combination. This empowers a value-based pricing scheme and improves the ARPU metric.

Further, in one aspect, the throughput estimation component 202 can determine estimated data rates and/or throughputs for each grid and report the values to a network data store (not shown). It is noted that the embodiments disclosed herein are described with reference to a NGFW network; however, the subject disclosure is not that limited and the disclosed embodiments can be implemented in other networks (e.g., nomadic networks). Typically, UEs within NGFW networks (and/or nomadic networks) have different attributes than UEs that are within a truly mobile network. For example, the NGFW UEs are stationary and thus, their radio environment can be with less variant over time. Further, the type of applications and/or services, executed by the UEs in the NGFW networks, and their traffic patterns can also be different from mobile UEs. In one aspect, a channel quality indicator (CQI) for these UEs can be more stable and predictive than the CQI for mobile UEs. The stability and accurate predictability of the CQI allows for efficiently predicting and/or implementing speed-tier settings.

In one aspect, managing delivery of target data rates associated with a speed tier subscribed by a customer can be implemented by various techniques. For example, in one aspect, an outer-loop scheduler can be utilized to allocate radio bearers to the customer's UE based on the target data throughout and a priority of the non-guaranteed bit rate (GBR) bearers of the UE can be dynamically adjusted to track the target data throughput. In another aspect, a throttling function can be implemented to limit the data throughput of the UE to the target data throughput.

Figure 3:
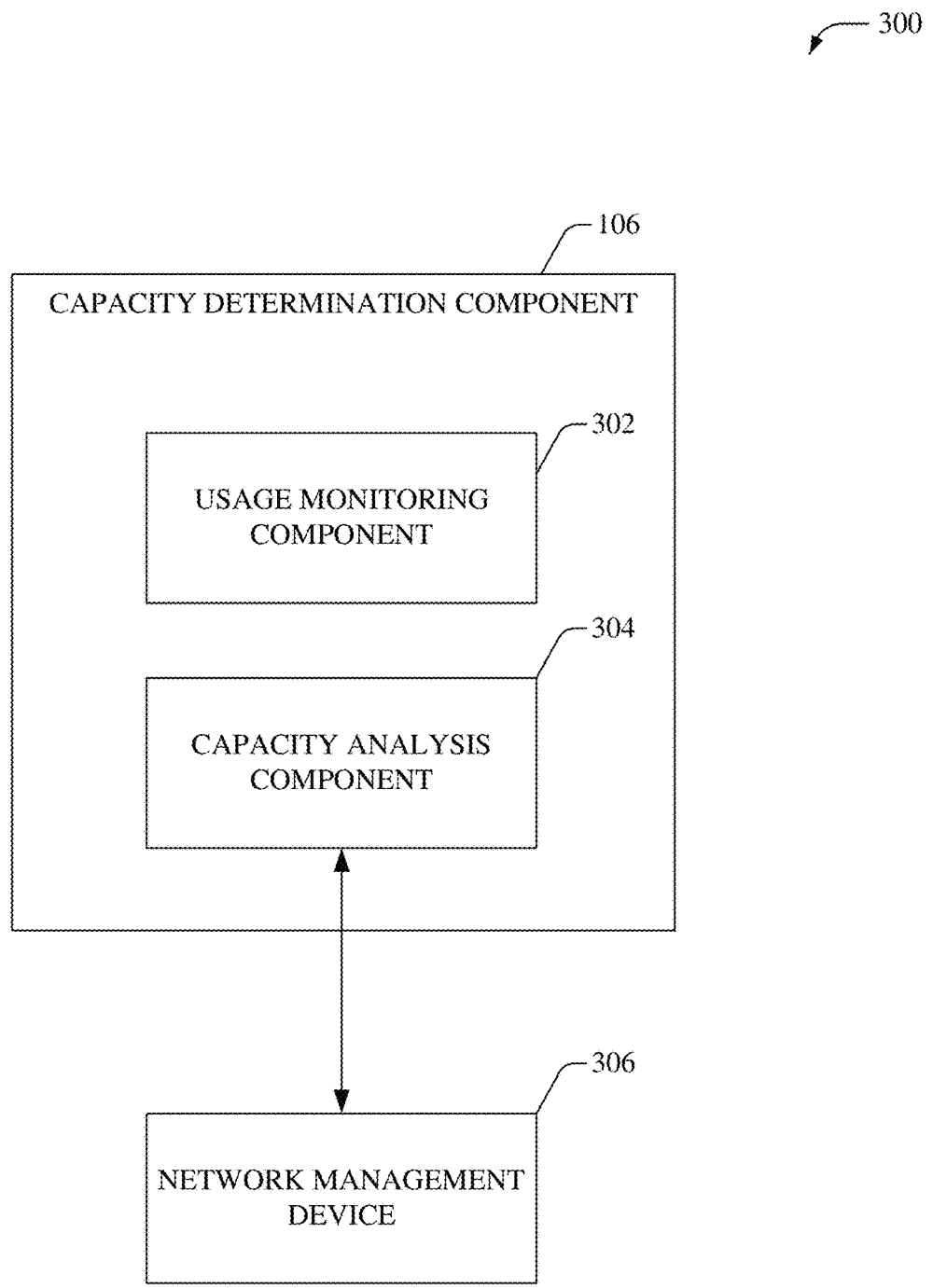
FIG. 3 illustrates an example system that facilitates network capacity management.

Referring now to FIG. 3, there illustrated is an example system 300 that facilitates network capacity management, in accordance with an aspect of the subject disclosure. It is noted that the capacity determination component 106 can comprise functionality as more fully described herein, for example, as described above with regards to system 100.

In one aspect, a usage monitoring component 302 can track network utilization of UEs deployed within an area, for example, within a grid and/or served by an access point (e.g., BTS). Oftentimes, actual network usage (e.g., throughput) can be different from the throughput (e.g., speed tier) subscribed by the UEs. For example, a user can utilize a throughput that is lower than the subscribed throughput, a user can execute applications that utilize lower data rates than the subscribed data rate, and/or a user can run applications that utilize the subscribed data rate only during certain time intervals (e.g., not during peak traffic hours, only at night, etc.). In such cases, a capacity analysis component 304 can determine the under-utilized network capacity and facilitate efficient capacity management to increase revenue (e.g., by registering new users).

According to an embodiment, the capacity analysis component 304 can evaluate the monitored network utilization to determine cell loading and/or capacity availability. As an example, the determination can be made periodically (e.g., daily, weekly, bi-weekly, etc.), during a defined time period, in response to an event, on-demand, during an idle period, etc. If the capacity analysis component 304 determines that cell loading and/or capacity availability satisfies a defined criterion (e.g., the cell is not overloaded and/or sufficient capacity is available), the capacity analysis component 304 can determine (and/or update) a target throughput (e.g., maximum available throughput) for all new/potential subscribers within the grid. It is noted that the capacity analysis component 304 can adjust the target throughput to account for throughput/traffic variations.

In an aspect, the target throughput can be utilized to update a capacity availability grid map that can be utilized by a sales tool for new customer registration. For example, if determined that existing users utilize 30% of total network capacity, then the capacity analysis component 304 can forecast in a live, near-live, and/or pseudo-live manner, the remaining capacity that is available to add more customers in a location/grid. In addition, the capacity availability grid map can be utilized to monitor the network by setting the cell capacity, key performance indicators (KPIs), and/or engineering limits. This allows the network to have sufficient capacity to handle transient conditions and the growth (e.g., registration of new users) between updates. The on-boarded users' profiles can be fed back to the capacity analysis component 304 as the inputs for the next update.

Further, in one aspect, if the capacity analysis component 304 determines that cell loading and/or capacity availability does not satisfy a defined criterion (e.g., the cell is overloaded, average network usage is above a defined threshold (engineering limit), and/or sufficient capacity is not available, etc.), the capacity analysis component 304 can generate and transmit a report and/or alert to a network management device 306. In an aspect, the network management device 306 can analyze the received reports and/or alerts to facilitate network planning. As an example, a first moment (speed) and a second moment (change of speed) of the KPIs can be used to alert the need and/or the urgency for network build out. The speed of reaching the engineering limits can be useful to "flag" the network planning team to plan for added cell sites and/or spectrum. For example, new access points can be deployed to serve grids that have consistently reported high network utilization (e.g., more than 70%). In case the usage demand exceeds the engineering limits, the operator can stop (e.g., temporarily) further on-boarding/registration of new subscribers within the specific grids/access point serving areas.

Figure 4:
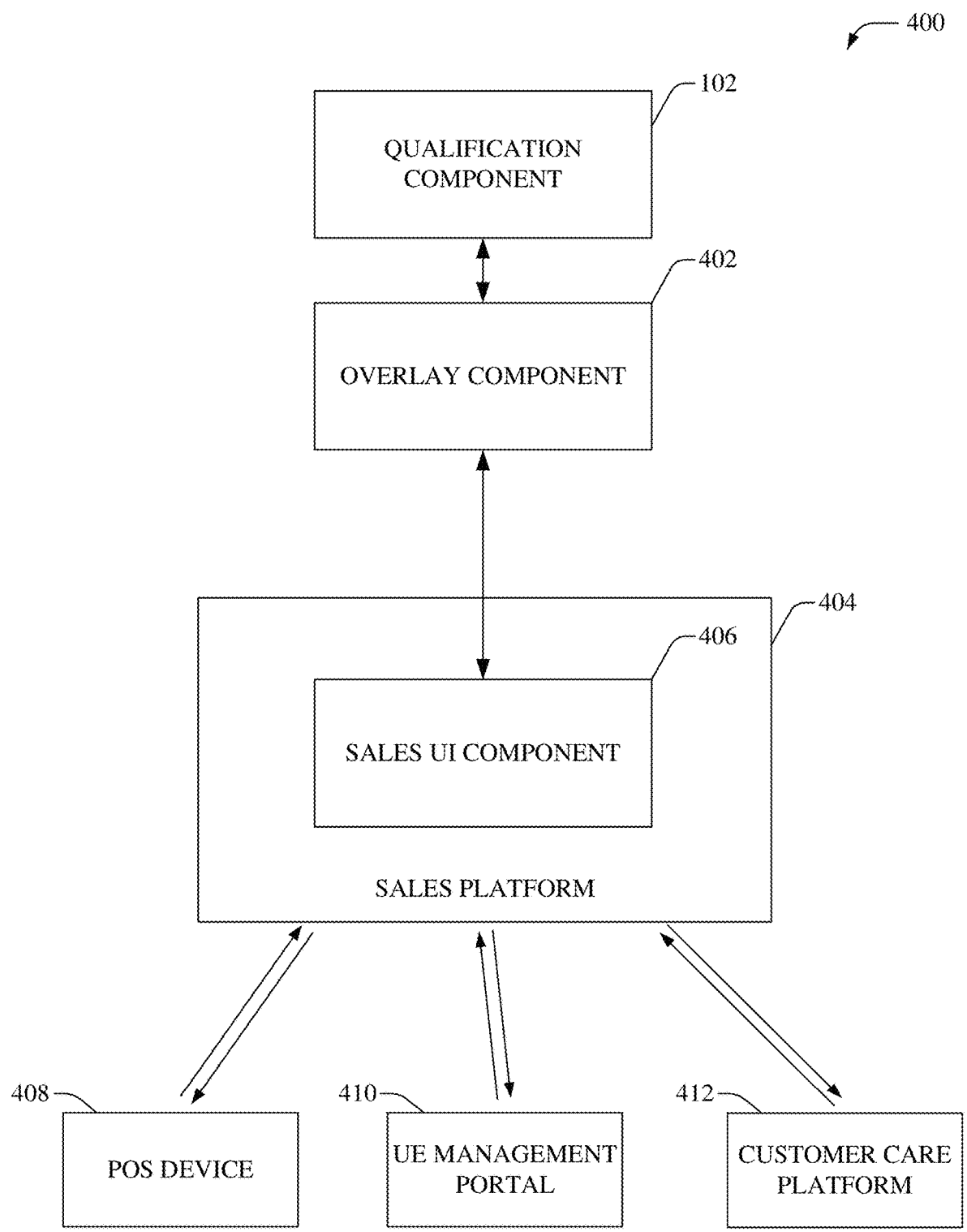
FIG. 4 illustrates an example system that facilitates integration of qualification data with a sales platform.

Referring now to FIG. 4, there illustrated is an example system 400 that facilitates integration of subscriber qualification data with a sales platform, according to an aspect of the subject disclosure. It is noted that the qualification component 102 can comprise functionality as more fully described herein, for example, as described above with regards to system 100.

The qualification component 102 can determine substantial throughput values and capacity availability for grids within a coverage area. In one aspect, this information can be mapping to a geographical map of the coverage area and the mapping can be stored within a network data store (not shown). In another aspect, the information can be provided to an overlay component 402 that can overlay/superimpose the information on a graphical/digital map of the coverage area to generate a user interface that can be made available to a sales platform 404, which in turn can utilize the overlaid information to efficiently on-board new customers and provide potential customers with flexible service billing options (e.g., based on available speed tiers)

In one aspect, the sales platform 404 can offer wireless service to the customers based on the different speed tiers that are available at a location at which the customer intends to deploy, install, and/or utilize a CPE/UE. For example, a higher fee can be charged for faster speeds. Typically, a request to set up a new (and/or update an existing) service agreement can be received by a sales UI component 406 from one or more devices, such as but not limited to, a point of sale device 408, a UE management portal 410, and/or a customer care platform 412. In one aspect, for fixed and/or nomadic UEs, a location and/or area (e.g., address, GPS location, etc.) of the UE can be provided to the sales UI component 406. For example, the customer can specify a geographical address (e.g., home address) at which the UE is to be utilized.

Typically, a UE management portal 410 can comprise a networked interface, e.g., a self-service or self-care web portal, which can be accessed by a new customer and/or an existing customer and can further support aspects of CPE/UE registration, activation, and management thereof. In another example, the customer care platform 412 can be accessed and operated by customer care agents to facilitate activation/deactivation of service, configuration of fees/rate plans, validation and changes of address, creation of subscriber accounts, etc.

According to an embodiment, the sales UI component 406 can compare the UE's location with the overlaid map to determine whether the network has sufficient capacity to add the UE within the corresponding grid (e.g., without overloading the cell and/or degrading throughput of existing customers). Further, the overlaid map can be utilized to determine speed tiers that can be offered at that location. In an aspect, the sales UI component 406 can provide to the customer, available speed tiers and corresponding charges, for selection. Additionally, or optionally, the charges can comprise flat fees for different combination of speed tiers and data usage. For example, a monthly rate of $30 can be charged for 150 GB per month with a DL/UL target throughput rate of 10 Mbps/1 Mbps (first speed tier); a monthly rate of $50 can be charged for 150 GB per month with a DL/UL target throughput rate of 25 Mbps/2 Mbps (second speed tier); a monthly rate of $65 can be charged for 150 GB per month with a DL/UL target throughput rate of 50 Mbps/5 Mbps (third speed tier) and so on and so forth combinations of GB per month usage and user's speed tier. Further, additional application(s) (e.g., voice, video streaming application, etc.) that can be offered at the location can also be determined and fees associated with the application(s) can be presented to the user. Based on the user's selection, a user-selected speed tier can be assigned to the subscriber account and this speed-tier information can be recorded as customer profile data that can be stored within a network data store, for example, home subscriber store (HSS).

Figure 5:
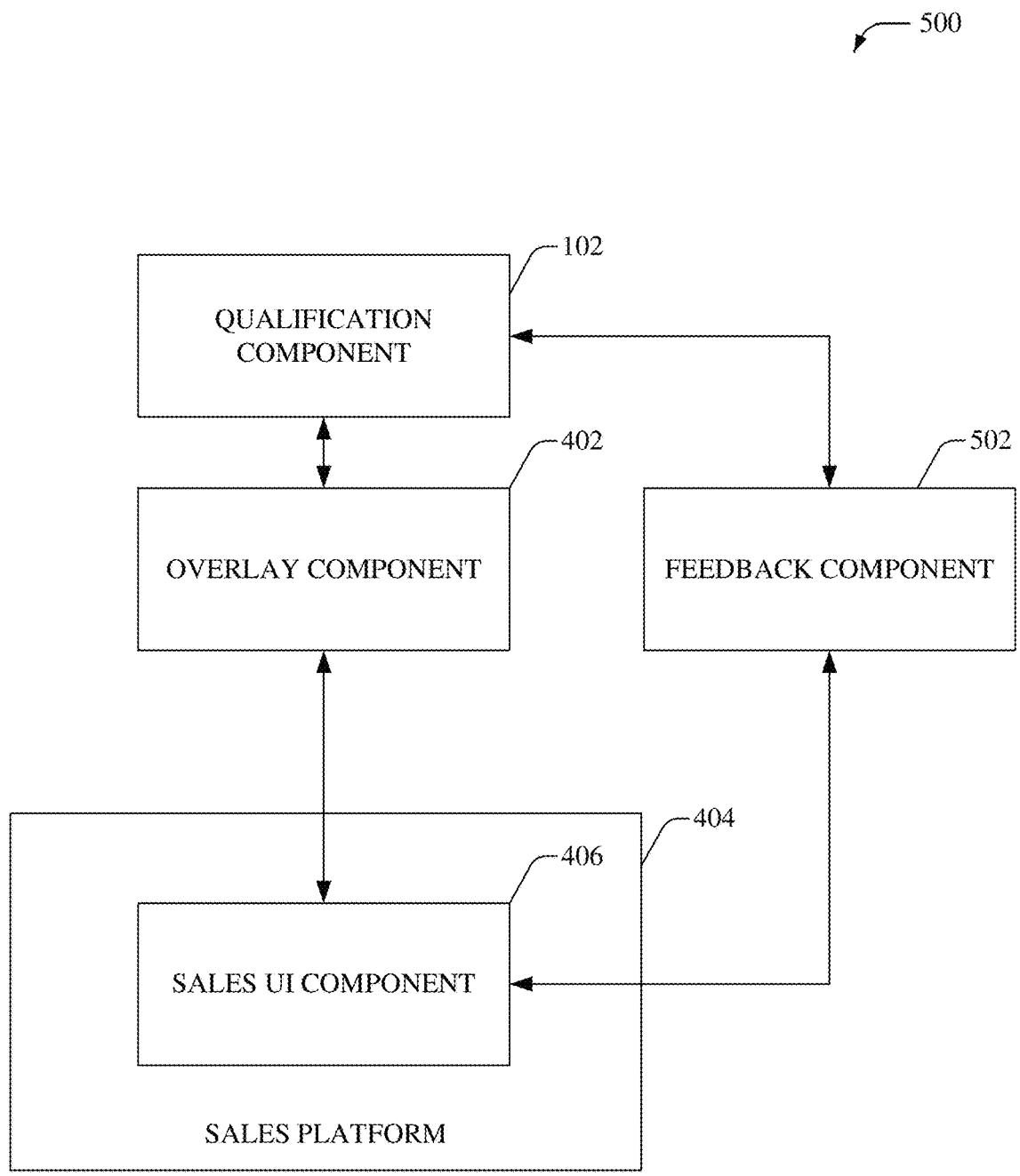
FIG. 5 illustrates an example system that provides new customer feedback to update subscriber qualification.

Referring now to FIG. 5, there illustrated is an example system 500 that provides new customer feedback to update subscriber qualification, according to an aspect of the subject disclosure. It is noted that the qualification component 102, overlay component 402, sales platform 404, and sales UI component 406 can comprise functionality as more fully described herein, for example, as described above with regards to systems 100 and 400.

In one aspect, when a new customer is on-boarded/registered, for example, via the sales UI component 406, a feedback component 502 can be utilized to provide the customer's profile (e.g., selected speed tier, applications/services, etc.) to the qualification component 102. As an example, the feedback component 502 can aggregate new customer profiles and provide the update to the qualification component 102 periodically, at a defined time, on-demand, in response to an event, etc. In an aspect, the qualification component 102 can utilize the update to modify the estimated data rate/throughput and/or available capacity within one or more grids. In response to a grid update, the overlay component 402 can update the overlaid information that is provided to the sales UI component 406 for subsequent on-boarding/registration of new customers.

Figure 6:
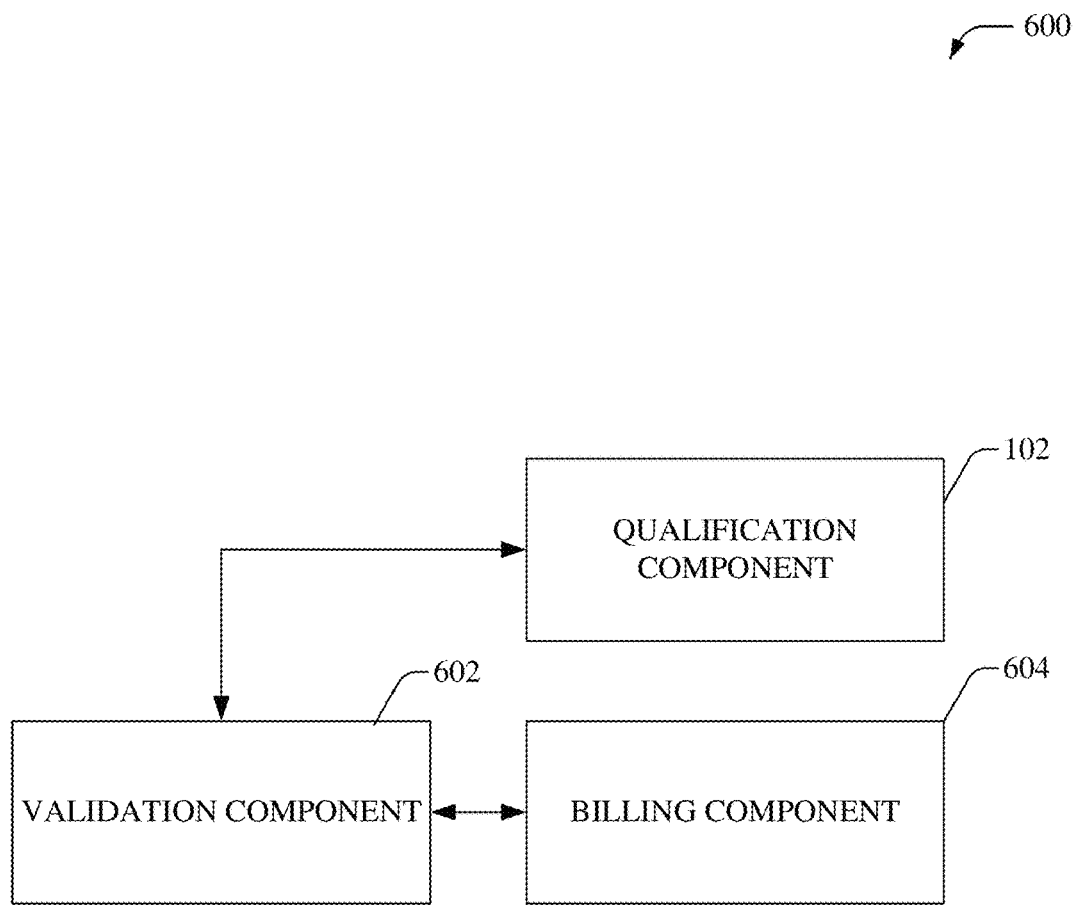
FIG. 6 illustrates an example system that facilitates billing subscribers at different speed-tier levels.

FIG. 6 illustrates and example system 600 that facilitates billing subscribers at different speed-tier levels. It is noted that qualification component 102 can comprise functionality as more fully described herein, for example, as described above with regards to systems 100, 400, and 500. A service provider can offer wireless service to a customer based on a customer-selected speed tier as part of a service agreement. As an example, a higher fee can be charged for higher speed tiers that correspond to higher data throughput and/or faster data rates.

During customer on-boarding/registration, a potential customer can be provided with flexible billing options corresponding to one or more speed tiers that are predicted to be available at the customer's location. The customer can select a speed tier for service based on his/her device/application speed requirements. In one aspect, prior to billing the customer based on the selected speed tier, a validation component 602 can be utilized to confirm that the target throughput corresponding to the selected speed tier is observed at the customer location. For example, during installation of the CPE (and/or at another time), a technician can manually measure the throughput at the customer location. In one aspect, if the measured throughput is greater than the target throughput corresponding to the selected speed tier, the customer can be notified and provided with an option to upgrade to a higher speed tier. Alternatively, if the measured throughput is less than the target throughput corresponding to the selected speed tier, the customer can be notified and provided with an option to subscribe to a lower speed tier. A billing component 604 can generate a bill for the customer based on the verified/measured throughput provided to the customer. In one aspect, the measured throughput can also be provided to the qualification component 102 to update the estimated data rate/throughput and/or available capacity within one or more grids.

The billing component 604 can monitor communications transmitted via the communication network and generate (e.g., periodically) an invoice (e.g., bill) presentation for the customer based on the selected speed tier (and/or speed tier and data bucket combination). As an example, a predefined flat fee can be charged for a specific speed tier. A customer can access (e.g., view, or download) his/her billed usage and make a payment. Service can be disconnected by the customer or by billing system initiated on subscription cancellation, customer suspension, lack of invoice payment, etc.

Figure 7:
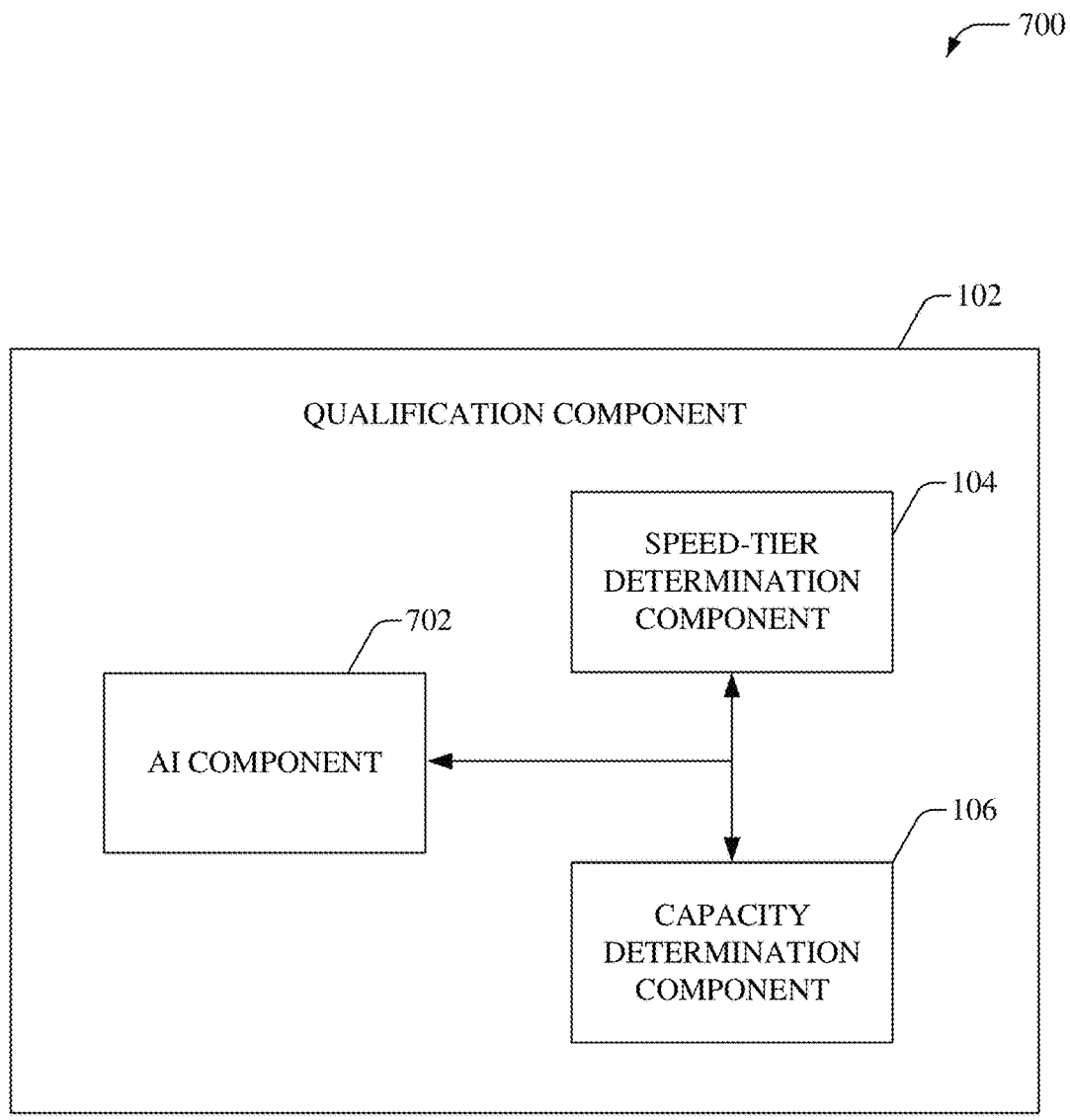
FIG. 7 illustrates an example method that facilitates automating one or more features in accordance with the subject embodiments.

Referring now to FIG. 7, there illustrated is an example system 700 that employs one or more artificial intelligence (AI) components 702, which facilitate automating one or more features in accordance with the subject embodiments. It can be appreciated that the qualification component 102, the speed-tier determination component 104, and the capacity determination component 106 can include respective functionality, as more fully described herein, for example, with regard to systems 100-600.

In an example embodiment, system 700 (e.g., in connection with automatically determining a sustainable throughput, available cell capacity, cell loading, etc.) can employ various AI-based schemes for carrying out various aspects thereof. For example, a process for qualification of a potential customer for service at a given location can be facilitated via an automatic classifier system implemented by AI component 702. A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from GIS devices, access points, web servers, etc. and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing traffic patterns, UE behavior, user/operator preferences, historical information, receiving extrinsic information, network load/congestion trends, type/configuration of UE/CPE, etc.). For example, SVMs can be configured via a learning or training phase within a classifier constructor and feature selection module. Thus, the classifier(s) of AI component 702 can be used to automatically learn and perform a number of functions, including but not limited to determining according to a predetermined criterion a sustainable throughput within a grid, cell capacity available in the grid, an optimal time to update the overlaid map, etc. The criteria can include, but is not limited to, historical patterns and/or trends, user preferences, service provider preferences and/or policies, current time, network load, antenna configurations, environmental factors, geographical terrain, weather data, event data, and the like.

Figure 8:
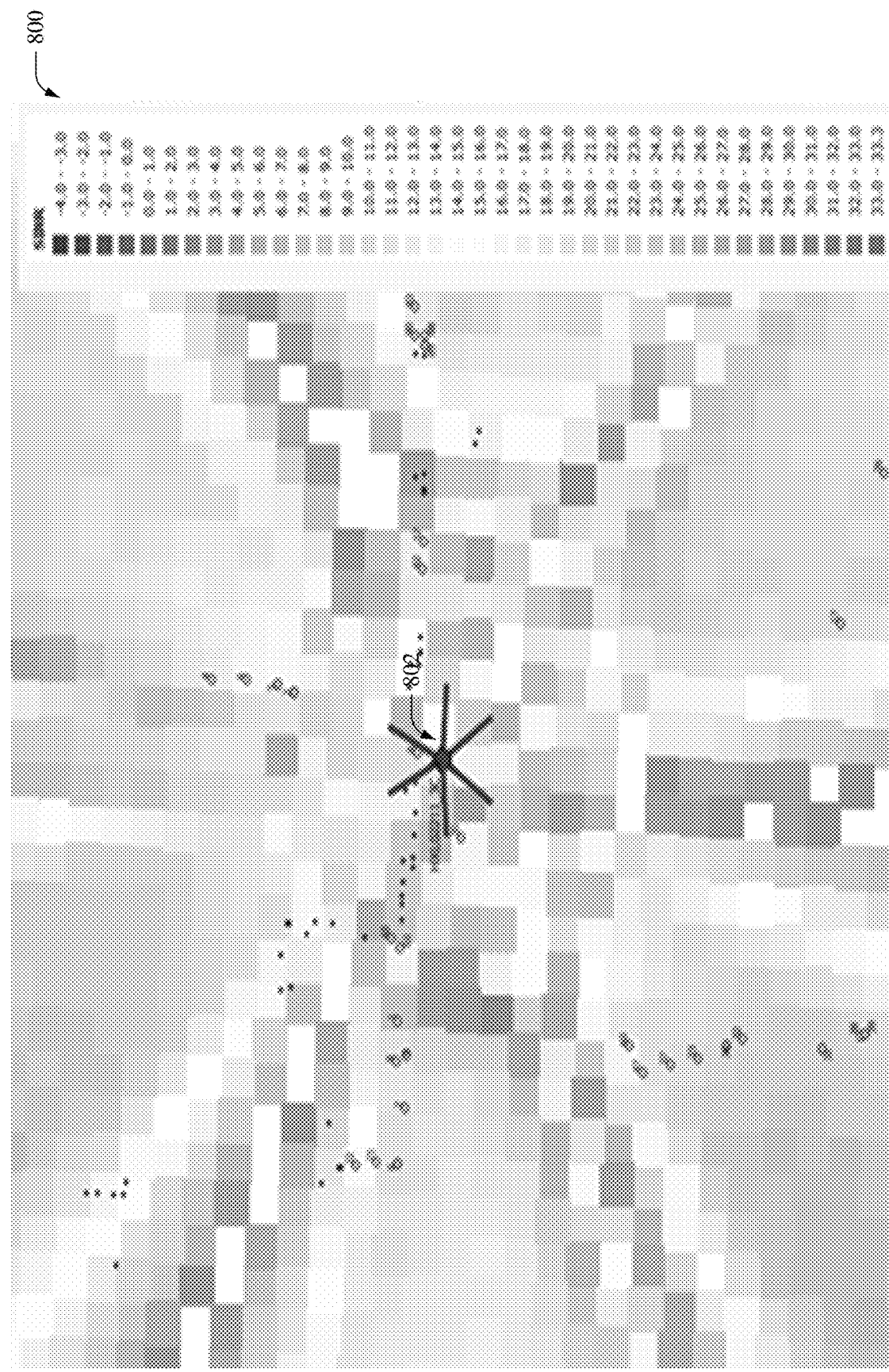
FIG. 8 illustrates an example grid plot that depicts estimated signal quality in different coverage areas in accordance with the subject disclosure.

FIG. 8 illustrates an example grid plot 800 that depicts estimated signal quality in different coverage areas in accordance with the subject disclosure. As described herein, the qualification component 102 can determine estimated data throughput that can be provided within a grid and the overlay component 402 can represent the estimated data throughput with different colors, shades, highlights, patterns, etc. and overlay the information over digital map of an area (e.g., county, city, country, etc.) to generate the grid plot 800. In one aspect, the qualification component 102 can estimate the Signal to Interference Noise ratio (SINR) at each of grid (e.g., 100 m×100 m) from a serving cell 802. The estimated SINR on the grid can correspond to a specific speed tier for the subscriber located within the grid. It is noted that the subject disclose is not limited to the plot 800 and most any audio and/or visual representation, that maps the estimated data throughput/speed tier to geographical locations, can be presented.

Figure 9:
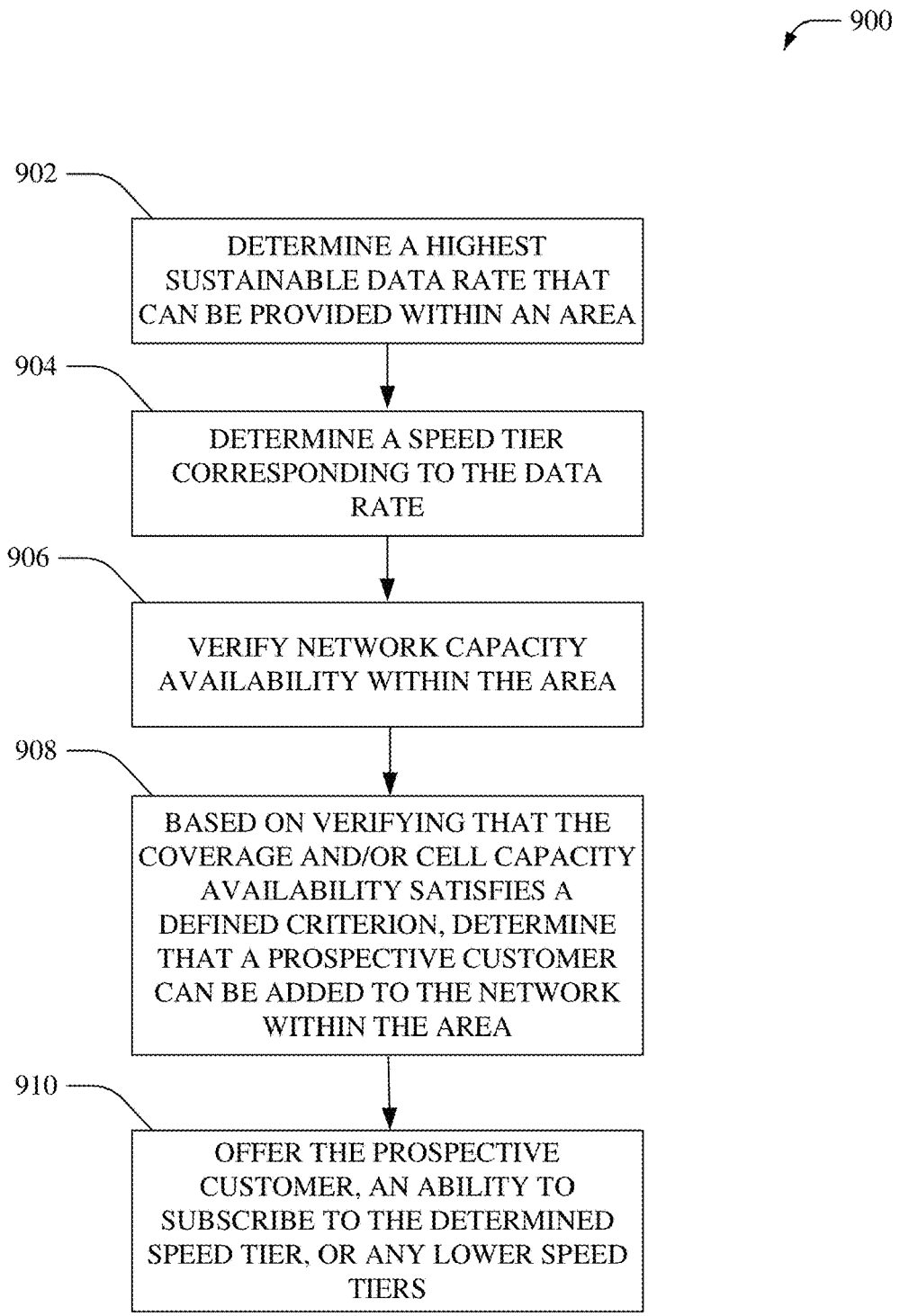
FIG. 9 illustrates an example method that facilitates qualifying potential customers for a communication service.
Figure 10:
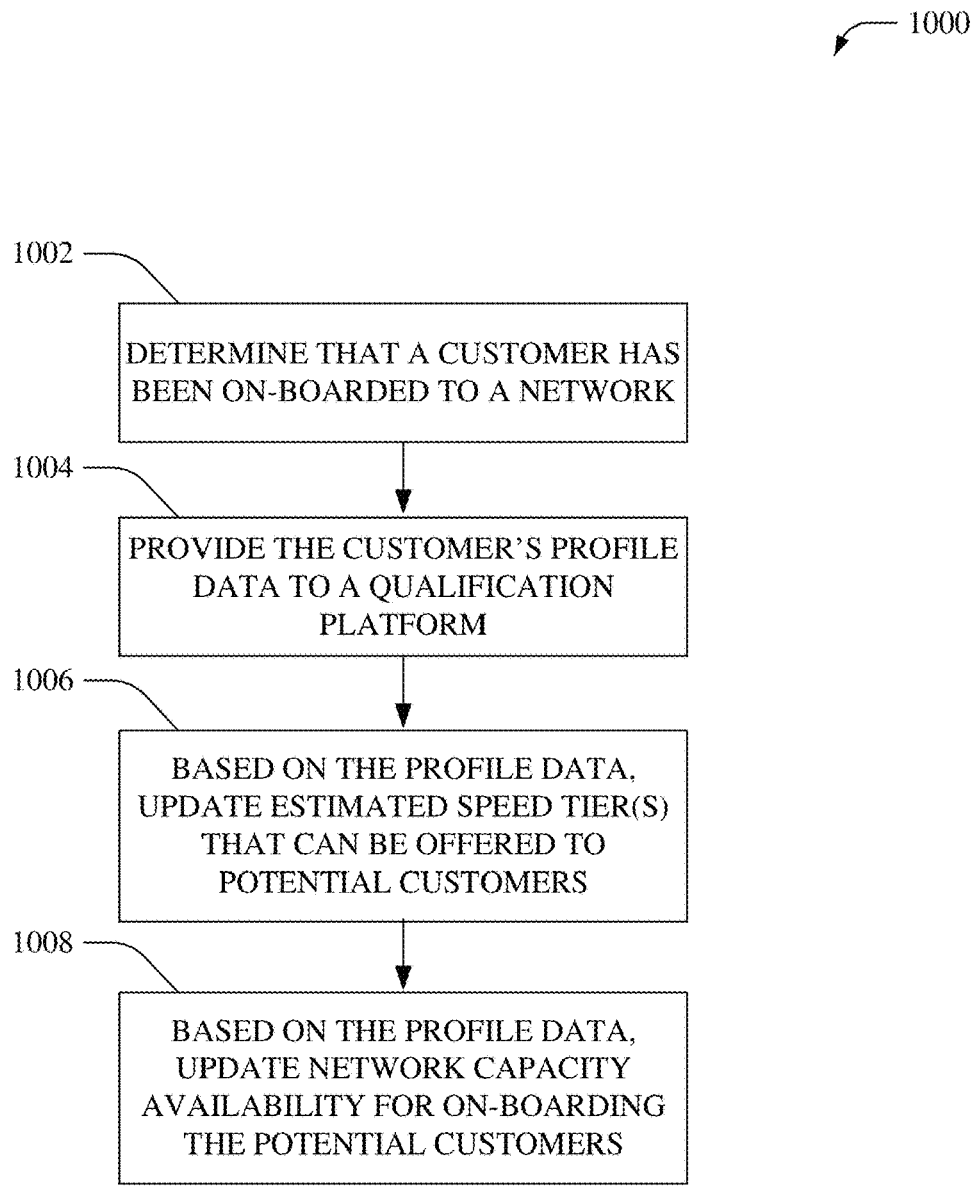
FIG. 10 illustrates an example method that facilitates updating subscriber qualification results.

FIGS. 9-10 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 9 there illustrated is an example method 900 that facilitates qualifying potential customers for a communication service, according to an aspect of the subject disclosure. In an aspect, method 900 can be implemented by one or network devices of a communication network (e.g., NGFW network). At 902, a highest sustainable data rate, for example, that can consistently be provided within an area (e.g., grid) can be determined. As an example, the highest sustainable data rate comprises a data rate value that satisfies a defined consistency criterion (e.g., has less than a defined threshold of variation). Various factors, such as, but not limited to, geographical and/or environmental data, weather data, information related to one or more cell site that serve the area (e.g., GIS data, antenna configuration, cell loading, etc.), radio signal propagation characteristics, etc. can be analyzed to determine a high probability and/or confidence level (e.g., greater than a defined threshold) that an estimated data rate/throughput can be provided within the area. At 904, a speed tier that corresponds to the estimated data rate can be determined. For example, higher speed tiers that correspond to a higher range of data rates and can be billed at a higher fee than lower speed tiers.

Further, at 906, network capacity availability within the area can be determined. For example, the network capacity availability (e.g., coverage and/or cell capacity availability) can be determined based on an analysis of observed capacity usage by existing customers within the area. In one aspect, the speed tier data and/or the network capacity availability can be provided to a sales platform and presented via a graphical representation. At 908, based on determining that the coverage and/or cell capacity availability satisfies a defined criterion (e.g., is greater than a defined threshold percentage), it can be determined that a prospective customer can be added to the network within the area. In addition, at 910, the prospective customer can be offered the ability to subscribe to the determines speed tier or lower speed tiers (if any). As an example, different speed tiers corresponding to different target throughput ranges can be defined by a network operator. This enables the prospective customer to customize their service and/or billing and provides increased flexibility for both user and operator. As an example, the data rate/throughput associated with the speed tier subscribed to by the customer can be manually verified (e.g., by a technician within the area) prior to billing and/or completing the registration of the customer.

FIG. 10 illustrates an example method 1000 that facilitates updating subscriber qualification results, according to an aspect of the subject disclosure. In one example, method 1000 can be implemented by one or more network devices of a communication network (e.g., NGFW network).

At 1002, it can be determined that a customer has been on-boarded to/registered with a network (e.g., NGFW network). In an example, if the customer is already registered with the network, then the acts 1004-1008 can be ignored. Otherwise, at 1004, the customer's profile data can be provided to a qualification platform. As an example, the profile data can comprise, but is not limited to, a location (e.g., address) at which the customer's CPE/UE is deployed or to be deployed, type of UE (e.g., indoor or outdoor), speed tier subscribed by the customer, etc. At 1006, based on the profile data, estimated speed tier(s) that can be offered to potential customers within the area can be updated. Further, at 1008, based on the profile data, network capacity availability for on-boarding/registering the potential customers can be updated.

Figure 11:
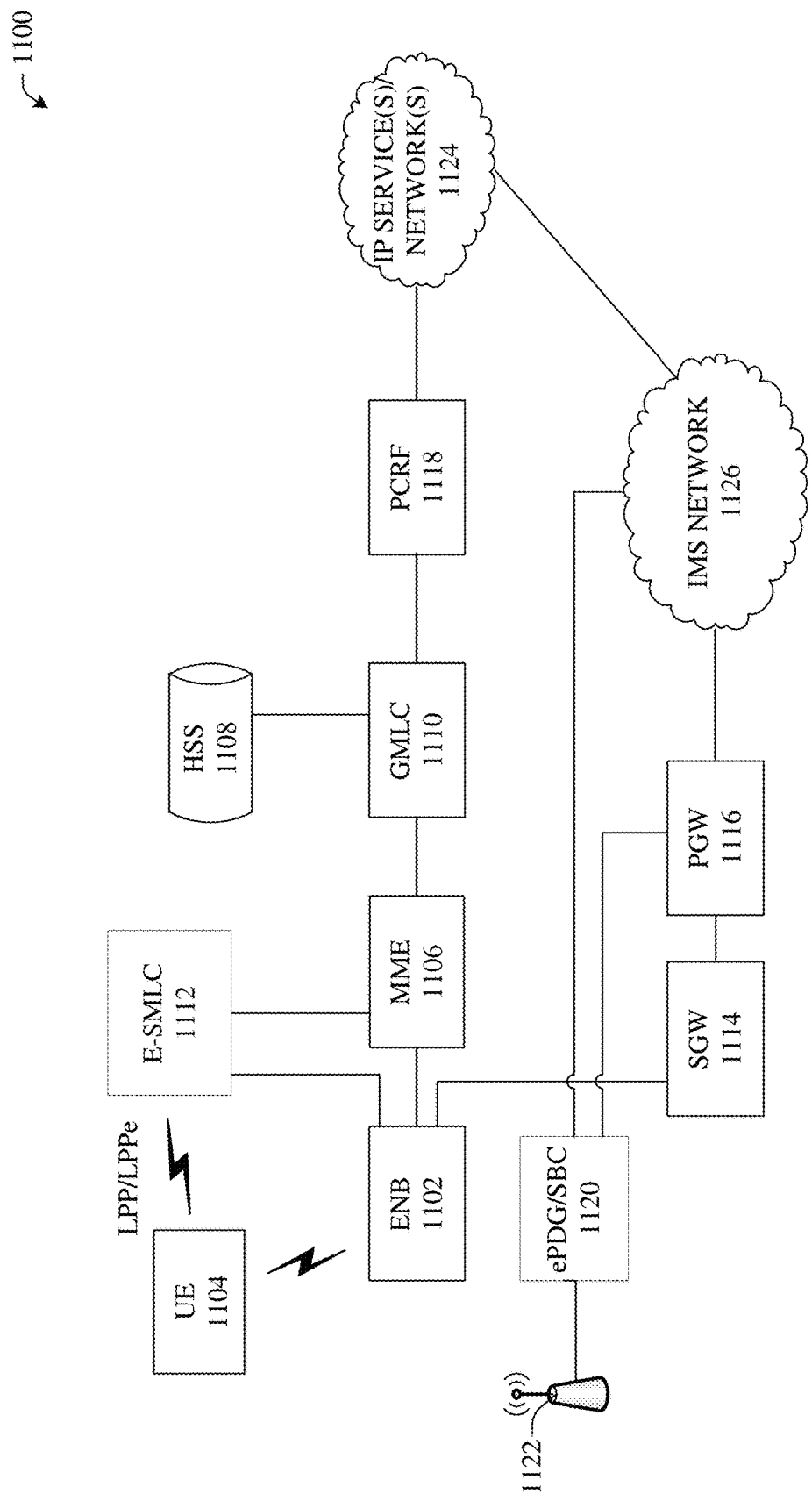
FIG. 11 illustrates a long term evolution (LTE) network architecture that can employ the disclosed architecture.

FIG. 11 illustrates a high-level block diagram that depicts an example LTE network architecture 1100 that can employ the disclosed communication architecture. In one aspect, network architecture 1100 can comprise at least a portion of systems 100-700. The evolved RAN for LTE consists of an eNB 1102 that can facilitate connection of UE 1104 to an evolved packet core (EPC) network. In one aspect, the UE 1104 is physical equipment such as a mobile phone or a laptop computer that is used by mobile subscribers, with a subscriber identity module (SIM). The SIM comprises IMSI and/or MSISDN, which is a unique identifier of a subscriber. The UE 1104 comprises an embedded client that receives and processes messages received by the UE 1104. As an example, the embedded client can be implemented in JAVA. In one aspect, the eNB 1102 can implement an outer loop scheduler and/or throttling functionality to prioritize RBs based on subscribed speed tiers.

The connection of the UE 1104 to the evolved packet core (EPC) network is subsequent to an authentication, for example, a SIM-based authentication between the UE 1104 and the evolved packet core (EPC) network. In one aspect, the MME 1106 provides authentication of the UE 1104 by interacting with the HSS 1108 via a Gateway Mobile Location Centre (GMLC) 1110. The GMLC 1110 can request routing information from the HSS 1108. The HSS 1108 contains a subscriber profile and keeps track of which core network node is currently handling the subscriber. It also supports subscriber authentication and authorization functions (AAA). In networks with more than one HSS 1108, a subscriber location function provides information on the HSS 1108 that contains the profile of a given subscriber. In one aspect, this authentication can be utilized to secure population of the user/device profile data by a primary user. Further, the MME 1106 can be coupled to an enhanced Serving Mobile Location Center (E-SMLC) 1112 supports location services (LCS) and coordinates positioning of the UE 1104. The UE 1104 and the E-SMLC can communicate using an LTE Positioning Protocol (LPP) and/or LPP extensions (LPPe).

As an example, the eNB 1102 can host PHY, MAC, RLC, and/or PDCP layers that comprise the functionality of user-plane header-compression and encryption. In addition, the eNB 1102 can implement at least in part Radio Resource Control (RRC) functionality (e.g., radio resource management, admission control, scheduling, cell information broadcast, etc.). The eNB 1102 can be coupled to a serving gateway (SGW) 1114 that facilitates routing of user data packets and serves as a local mobility anchor for data bearers when the UE 1104 moves between eNBs. The SGW 1114 can act as an anchor for mobility between LTE and other 3GPP technologies (GPRS, UMTS, etc.). When UE 1104 is in an idle state, the SGW 1114 terminates a downlink (DL) data path and triggers paging when DL data arrives for the UE 1104. Further, the SGW 1114 can perform various administrative functions in the visited network such as collecting information for charging and lawful interception. In one aspect, the SGW 1114 can be coupled to a PGW 1116 that provides connectivity between the UE 1104 and external packet data networks such as IP service(s)/network(s) 1124 via the IP Multimedia Subsystem (IMS) network 1126. Moreover, the PGW 1116 is a point of exit and entry of traffic for the UE 1104. It is noted that the UE 1104 can have simultaneous connectivity with more than one PGW (not shown) for accessing multiple PDNs. Among other functions, the PGW 1116 can "anchor" mobility between 3GPP and non-3GPP technologies. The PGW 1116 can provide connectivity from the UE (e.g., UE 1104) to external packet data network (PDN) by being the point of entry or exit of traffic for the UE. Additionally, the PGW 1116 can facilitate policy enforcement, packet filtration for users, charging support, etc.

The PGW 1116 performs IP address allocation for the UE 1104, as well as QoS enforcement and implements flow-based charging according to rules from a Policy Control and Charging Rules Function (PCRF) 1118. The PCRF 1118 can facilitate policy control decision-making and control flow-based charging functionalities in a Policy Control Enforcement Function (PCEF), which resides in the PGW 1116. The PCRF 1118 can store data (e.g., QoS class identifier and/or bit rates) that facilitates QoS authorization of data flows within the PCEF. In one aspect, the PGW 1116 can facilitate filtering of downlink user IP packets into the different QoS-based bearers and perform policy enforcement, packet filtering for each user, charging support, lawful interception and packet screening. Further, the PGW 1116 acts as the anchor for mobility between 3GPP and non-3GPP technologies such as WiMAX and 3GPP2 (CDMA 1× and EvDO). An Evolved Packet Data Gateway (ePDG) 1120 is employed for communications between the EPC and untrusted non-3GPP networks that require secure access, such as a Wi-Fi, LTE metro, and femtocell access networks, for example served by access point 1122. Although a LTE network architecture 1100 is described and illustrated herein, it is noted that most any communication network architecture can be utilized to implement the disclosed embodiments.

Figure 12:
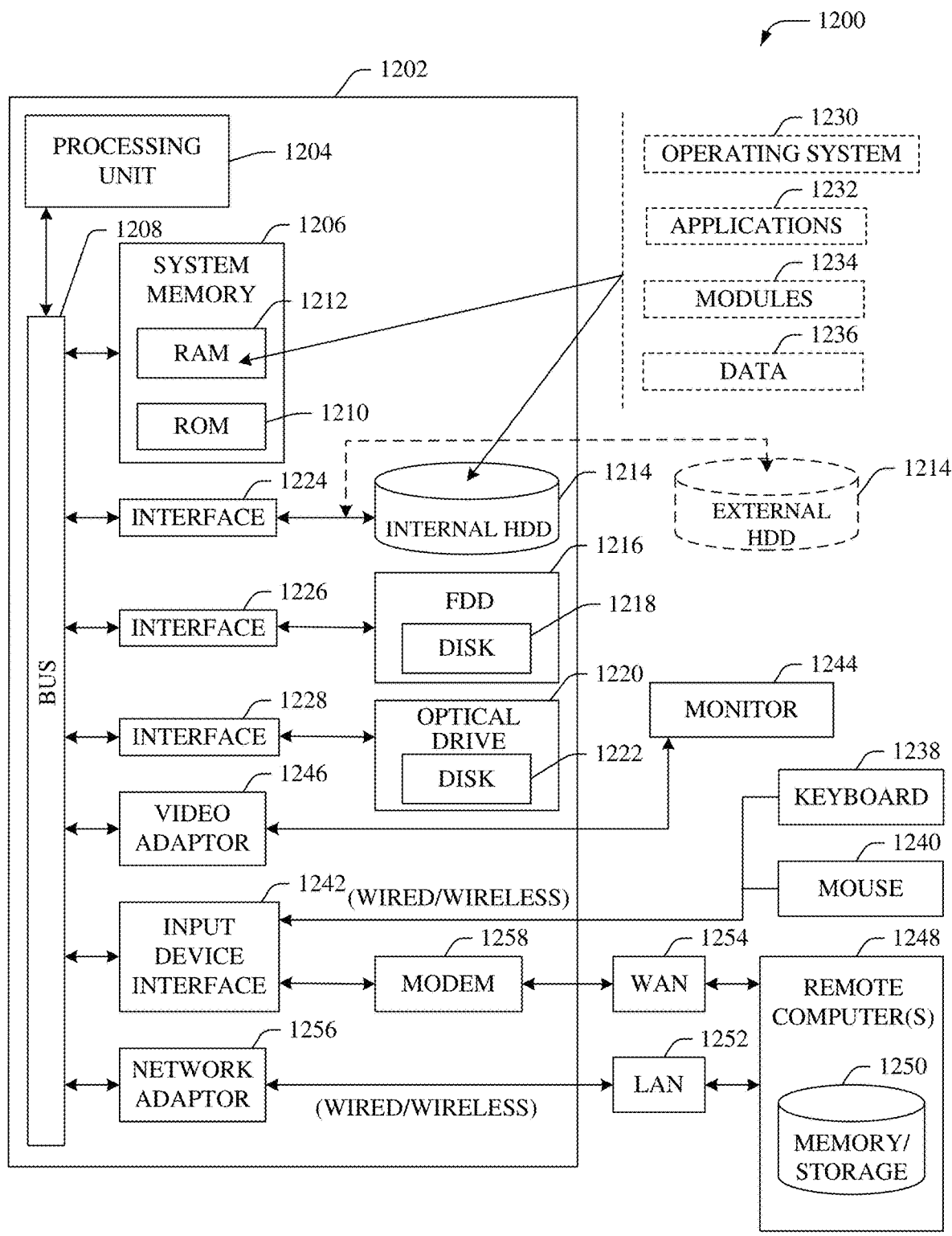
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), application(s) server(s), equipment, system(s), interface(s), gateway(s), controller(s), node(s), entity(ies), function(s), platform(s), cloud(s) and/or device(s) (e.g., qualification component 102, speed-tier determination component 104, capacity determination component 106, throughput estimation component 202, radio environment component 204, GIS component 206, traffic demand component 208, antenna configuration component 210, usage monitoring component 302, capacity analysis component 304, network management device 306, overlay component 402, sales platform 404, sales UI component 406, POS device 408, UE management portal 410, customer care platform 412, feedback component 502, validation component 602, billing component 604, AI component 702, eNB 1102, UE 1104, MME 1106, HSS 1108, GMLC 1110, E-SMLC 1112, SGW 1114, PGW 1116, PCRF 1118, ePDG/SBC 1120, access point 1122, IP services/networks 1124, IMS network 1126, etc.) disclosed herein with respect to systems 100-700 and 1100 can each comprise at least a portion of the computer 1202. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is noted that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless access point disposed thereon for communicating with the wireless adapter 1256.

When used in a WAN networking environment, the computer 1202 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be noted that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
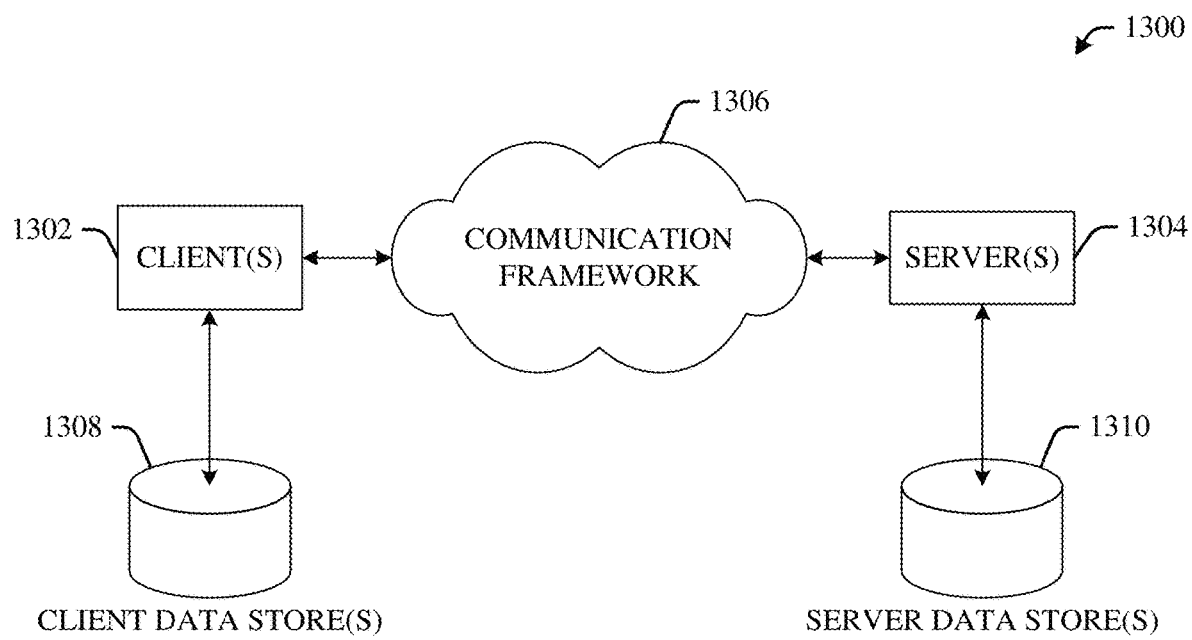
FIG. 13 illustrates a schematic block diagram of a computing environment in accordance with the subject specification.

Referring now to FIG. 13, there is illustrated a schematic block diagram of a computing environment 1300 in accordance with the subject specification. The system 1300 comprises one or more client(s) 1302. The client(s) 1302 can be hardware and/or software (e.g., threads, processes, computing devices).

The system 1300 also comprises one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may comprise a cookie and/or associated contextual information, for example. The system 1300 comprises a communication framework 1306 (e.g., a global communication network such as the Internet, cellular network, etc.) that can be employed to facilitate communications between the client(s) 1302 and the server(s) 1304.

Communications can be facilitated via a wired (comprising optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
adjusting respective sizes of defined grids of a geographical map of an area based on respective quantities of people within the defined grids;
based on an analysis of information indicative of a radio environment in the area, estimating respective sustainable data rates that are consistently provided within the defined grids of the geographical map via respective radio interfaces of a network and according to a defined consistency criterion, wherein the information comprises characteristic data associated with propagation of radio signals transmitted within the defined grids;
determining speed tier data indicative of speed tiers that correspond to the respective sustainable data rates, wherein the speed tiers are associated with respective defined billing fees;
in response to receiving request data indicative of a request for a speed-tier qualification of a customer premises equipment in a grid of the grids, estimating a sustainable data rate that is to be provided within the grid to the customer premises equipment based on the information; and
initiating a presentation of the speed tier data via a sales interface to facilitate a registration of a prospective customer device that is to be coupled to the radio interface.

2. The system of claim 1, wherein the operations further comprise:
monitoring traffic demand within the area with reference to the speed-tiers, to which existing customer devices have subscribed; and
based on the monitoring, determining network capacity availability to facilitate the registration of the prospective customer device.

3. The system of claim 1, wherein the information further comprises configuration data indicative of a configuration of an antenna of a customer premises equipment that is to be deployed within the area.

4. The system of claim 1, wherein the information further comprises configuration data indicative of a configuration of a base transceiver station device that serves a portion of the area.

5. The system of claim 1, wherein the information further comprises foliage data indicative of foliage in the area.

6. The system of claim 1, wherein information further comprises weather data.

7. The system of claim 1, wherein facilitating the presentation comprises overlaying the speed tier data on a geographical map.

8. The system of claim 1, wherein the operations further comprise:
monitoring network utilization of equipment deployed within the grid; and
based on the monitoring, determining capacity data indicative of network capacity availability within the grid.

9. The system of claim 8, wherein the registration of a prospective customer device is a first registration, and wherein the operations further comprise:
receiving address data indicative of a location at which the customer premises equipment is to be deployed; and
in response to determining that the location is within the grid and based on the capacity data, verifying that sufficient capacity is available to support the customer premises equipment, prior to a second registration of the customer premises equipment.

10. The system of claim 8, wherein the operations further comprise:
in response to determining that the capacity data satisfies a defined overload criterion, directing, by the system, alert data to a network management device that facilitates network expansion.

11. The system of claim 10, wherein determining that the capacity data satisfies the defined overload criterion comprises determining that a defined engineering limit has been exceeded.

12. A method, comprising:
adjusting, by a system comprising a processor, respective sizes of defined grids of a geographical map based on respective quantities of people within the defined grids;
based on a radio environment analysis, estimating, by the system, respective sustainable data rates that are consistently provided within the defined grids of the geographical map via respective radio interfaces of a network and according to a defined consistency criterion, wherein the radio environment analysis comprises an analysis of characteristic data associated with propagation of radio signals transmitted within the defined grids;
determining, by the system, speed tier data indicative of speed tiers that correspond to the respective sustainable data rates, wherein the speed tiers are associated with respective billing fees for providing a communication service via a network equipment;
in response to receiving request data indicative of a request for a speed-tier qualification of a customer premises equipment in a grid of the grids, estimating a sustainable data rate that is to be provided within the grid to the customer premises equipment based on terrain data indicative of a geographical terrain of the grid; and
superimposing, by the system, the speed tier data over the geographical map to generate a presentation that is to be displayed via a sales interface that indicates a speed tier corresponding to the sustainable data rate that is available to the customer premises equipment to facilitate registration of the customer premises equipment.

13. The method of claim 12, further comprising:
receiving, by the system, address data indicative of a location at which the customer premises equipment is to be deployed; and
based on a comparison of the address data and the presentation, determining, by the system, a group of the speed tiers that are available at the location.

14. The method of claim 12, further comprising:
monitoring, by the system, network utilization of equipment deployed within the grid; and
based on the monitoring, determining, by the system, capacity data indicative of network capacity availability within the grid.

15. The method of claim 14, further comprising:
receiving, by the system, address data indicative of a location at which the customer premises equipment is to be deployed; and in response to determining that the location is within the grid and based on the capacity data, verifying, by the system, that sufficient capacity is available to support the customer premises equipment, prior to a registration of the customer premises equipment.

16. The method of claim 14, further comprising:
in response to determining that the capacity data satisfies a defined overload criterion, directing, by the system, alert data to a network management device that facilitates network expansion.

17. The method of claim 16, wherein determining that the capacity data satisfies the defined overload criterion comprises determining that a defined engineering limit has been exceeded.

18. The method of claim 14, further comprising:
based on a collective data analysis, determining, by the system, aggregated data usage of network resources during a defined time period;
based on the aggregated data usage, fine-tuning, by the system, network capacity management;
based on the aggregated data usage, fine-tuning, by the system, network expansion; and
based on the aggregated data usage, providing, by the system, a potential differential pricing scheme to subscribers to increase utilization of the network resources.

19. A non-transitory machine-readable medium, comprising executable instructions that, when executed by a processor of a system, facilitate performance of operations, comprising:

adjusting respective sizes of defined grids of a geographical map of an area based on respective quantities of people within the defined grids;
based on an analysis of information indicative of a radio environment within the area, estimating sustainable data rates that are consistently provided within the defined grids of the geographical map via respective radio interfaces a fixed wireless network, and according to a defined variation criterion, wherein the information comprises characteristic data associated with propagation of radio signals transmitted within the defined grids;
determining speed tier data indicative of speed tiers corresponding to the respective sustainable data rates, wherein the speed tiers are associated with respective defined billing fees for providing a communication service;
in response to receiving request data indicative of a request for a speed-tier qualification of the user equipment, estimating a sustainable data rate that is to be provided within the grid to the user equipment based on the information; and
facilitating a presentation of the speed tier data to indicate the speed tier that is available to the user equipment.

20. The non-transitory machine-readable medium of claim 19, wherein the information further comprises configuration data indicative of a configuration of a base transceiver station device that serves a portion of the area.

* * * * *